(12) United States Patent
Goel et al.

(10) Patent No.: US 8,046,717 B1
(45) Date of Patent: Oct. 25, 2011

(54) METHOD TO AUTOMATICALLY DETERMINE THE THUMBNAIL OF A DOCUMENT

(75) Inventors: Paresh Goel, Bareilly (IN); Ayusman Sarangi, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 609 days.

(21) Appl. No.: 11/683,433

(22) Filed: Mar. 8, 2007

(51) Int. Cl.
*G06F 3/048* (2006.01)

(52) U.S. Cl. ......................... 715/838; 715/810

(58) Field of Classification Search .................... 715/838
See application file for complete search history.

(56) References Cited

U.S. PATENT DOCUMENTS

| | | | | |
|---|---|---|---|---|
| 5,479,602 A | * | 12/1995 | Baecker et al. | 715/838 |
| 5,586,237 A | * | 12/1996 | Baecker et al. | 345/670 |
| 5,598,557 A | | 1/1997 | Doner et al. | |
| 6,496,206 B1 | | 12/2002 | Mernyk et al. | |
| 6,665,836 B1 | * | 12/2003 | Wynblatt et al. | 715/205 |
| 6,816,272 B2 | * | 11/2004 | Oliver | 358/1.15 |
| 6,883,138 B2 | | 4/2005 | Rosenholtz | |
| 6,993,726 B2 | * | 1/2006 | Rosenholtz et al. | 715/835 |
| 7,003,736 B2 | * | 2/2006 | Kanevsky et al. | 715/837 |
| 7,215,436 B2 | * | 5/2007 | Hull et al. | 358/1.15 |
| 7,266,768 B2 | * | 9/2007 | Ferlitsch et al. | 715/273 |
| 7,543,246 B2 | * | 6/2009 | Mifune | 715/838 |
| 7,555,729 B2 | * | 6/2009 | Mifune et al. | 715/838 |
| 2001/0016859 A1 | * | 8/2001 | Sekido et al. | 707/530 |
| 2003/0030678 A1 | * | 2/2003 | Rosenholtz et al. | 345/838 |
| 2003/0210281 A1 | * | 11/2003 | Ellis et al. | 345/838 |
| 2005/0251758 A1 | * | 11/2005 | Cummins et al. | 715/838 |
| 2006/0230362 A1 | * | 10/2006 | Matsusaka | 715/838 |
| 2008/0034325 A1 | * | 2/2008 | Ording | 715/838 |
| 2008/0123123 A1 | * | 5/2008 | Kawaharada | 358/1.12 |

* cited by examiner

*Primary Examiner* — Ashraf Zahr
(74) *Attorney, Agent, or Firm* — Robert C. Kowert; Meyertons, Hood, Kivlin, Kowert & Goetzel, P.C.

(57) ABSTRACT

A system and method for automatically generating the most relevant thumbnail of a document. Every page of a multi-page document is analyzed for rich content. Based on this analysis, a score is assigned to every page of the document depending on certain parameters such as the amount of rich content and number of occurrences of rich content on each page. The page with the highest score is identified and this page is selected as the thumbnail of the document.

21 Claims, 6 Drawing Sheets

METHOD TO AUTOMATICALLY DETERMINE THE THUMBNAIL OF A DOCUMENT

BACKGROUND

1. Technical Field

The invention in preferred embodiments relates generally to forming thumbnails of documents and more specifically to selecting images to form thumbnails.

2. Prior Art

A thumbnail is a page from a multi-page document that represents the content of the entire document. Typically, the thumbnail is derived automatically from the first page of a multi-page document, but when the first page is blank or does not have much content and hence does not meaningfully represent the document, this is unsatisfactory. Thus, an automatically selected first page thumbnail is not necessarily the best thumbnail of the document.

Thumbnails are also selected manually by document creators scanning each page of a document. This takes a long time and is tedious and subjective since the thumbnail is selected based on the user's interpretation of the document.

Thus, there remains a need for a way to automatically determine the most eligible thumbnail of a multi-page document.

SUMMARY

Embodiments of the invention, described herein provide a system and a method for determining the most relevant thumbnail of a multi-page document.

In one embodiment the entire multi-page document is analyzed page by page based on certain parameters to generate the most relevant thumbnail of the document. Such parameters are aimed at analyzing the amount of rich content appearing on each page as well as the number of occurrences of rich content on each page. Based on this analysis, every page of the document is assigned a score. Finally, the page with the highest score is identified as the most relevant thumbnail of the multi-page document. It is possible for multiple pages in the document to be assigned the same score, in which case the multiple pages are formed into a collage which is selected as the thumbnail.

Embodiments of the invention help identify the most relevant thumbnail of a multi-page document from the perspective of the document creator. Pages with rich content are more complicated to put together and typically have valuable data as compared to simple plain text pages. Thus, selecting a rich content page as the thumbnail of a document is likely to reflect the creator's intent.

From a document user's perspective, pages with richer content are more meaningful than pages with simple plain text. Users can spend more time on rich content pages, for example browsing hyperlinks, analyzing data in tables and viewing embedded images and videos. Since it is more probable for users to remember such rich-content pages in the document, selecting such pages as the thumbnail of the document is more meaningful.

Other embodiments may be used in products such as Adobe®Bridge and Version Cue® for the purpose of asset management.

This summary is not intended to describe each embodiment of the invention. The Detailed Description and Figures that follow provide additional aspects of embodiments of the invention.

DETAILED DESCRIPTION OF EMBODIMENTS

Figure 1:
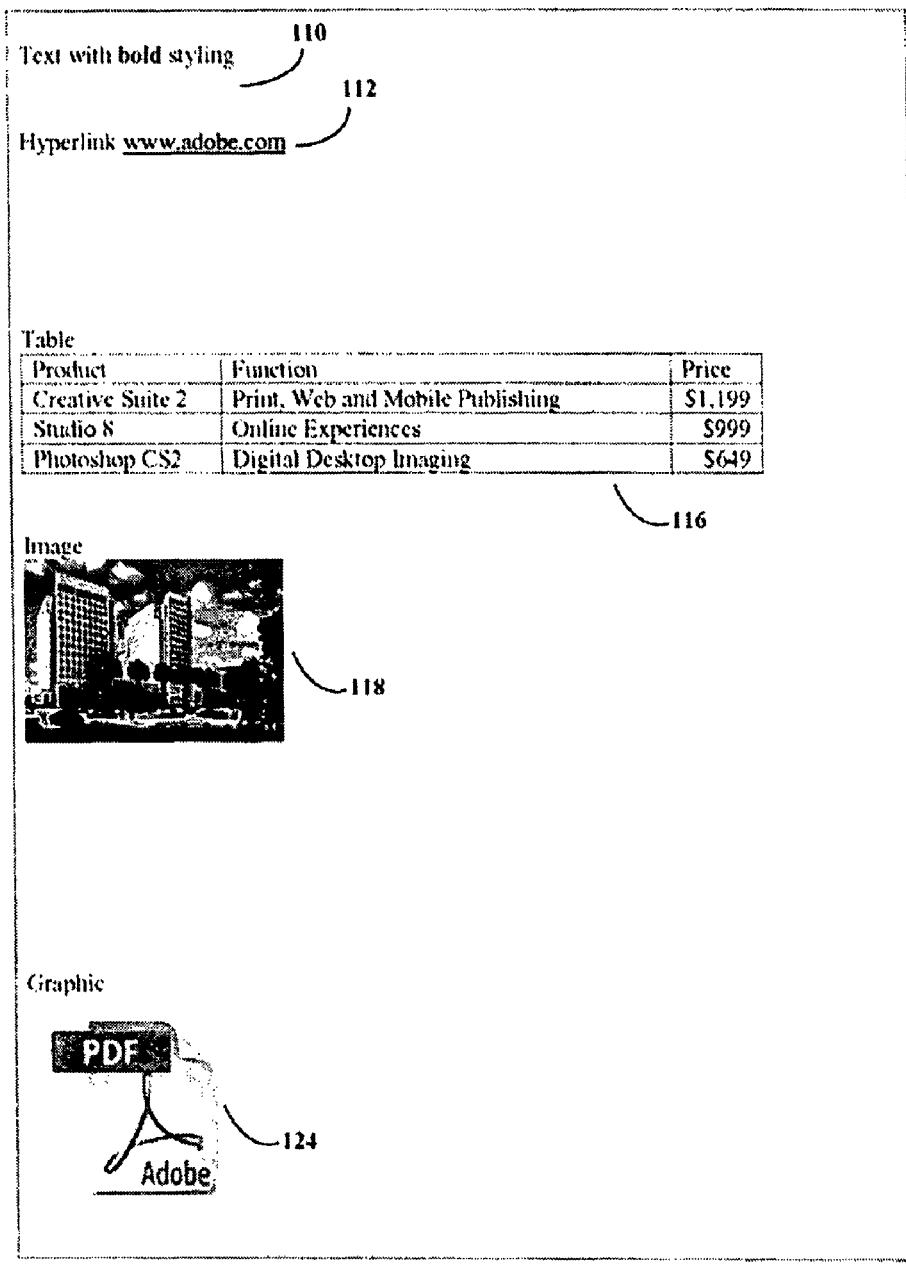
FIG. 1 illustrates various types of Rich Content.

Embodiments of the invention analyze multi-page documents for Rich Content types. FIG. 1 shows an example "Rich Content" page illustrating various Rich Content types such as "Text with bold styling" 110, "Hyperlinks" 112, "Tables" 116, "Images" 118, and "Graphics" 124. A "Rich Content Page" is a page containing at least one of the Rich Content types such as Text with styling (i.e. bold, italic, underline, colored), hyperlinks, images, comments and tables. Two pages with rich content can differ in the type of rich content on the pages and in the number of occurrences of rich content of each type on the pages. For example, in one embodiment, a page containing two hyperlinks and three images is richer than a page containing two hyperlinks and one image. A preferred embodiment analyzes the content on each page to calculate its score, and elects the page with the highest score as the thumbnail of the document.

Figure 2:
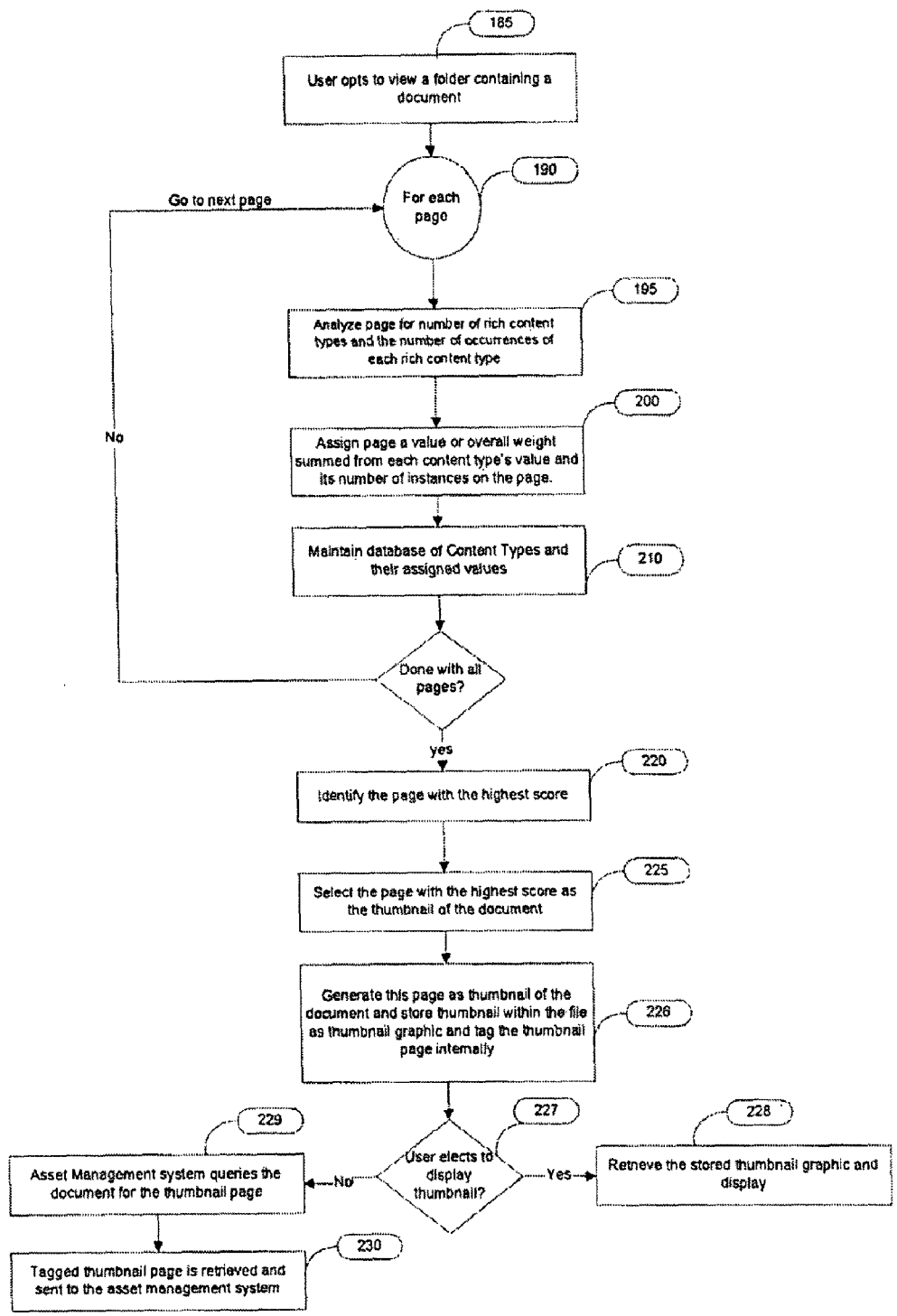
FIG. 2 is a flowchart illustrating the sequence of steps in determining the thumbnail of a multi page document in accordance with a preferred embodiment of the invention.

FIG. 2 is a flowchart illustrating a sequence of steps in determining the thumbnail of a multi-page document in accordance with an embodiment of the invention. The method starts in step 185, when a use opts to view a folder containing a document. Content types may be assigned weights as for example in the following table:

| Text with bold styling | 1 |
| Hyperlinks | 1.5 |
| Comments | 2 |
| Tables | 2.5 |
| Images | 3 |
| Audio | 3.5 |
| Video | 4 |
| Graphics | 4.5 |

For each: page in step 190, step 195 analyzes the number of rich content types and the number of occurrences of each type. Step 200 calculates a weight or score of the rich content of the page. Step 210 maintains a database of content types, weights assigned to the content types, and total weight or score of each page.

After step 215 concludes that all the pages have been weighed step 220 identifies the page with the highest score. Step 225 selects this page as the thumbnail of the document. This thumbnail may then be stored with the file as a thumbnail graphic or icon for the file. Step 226 generates this page as the thumbnail of the document, stores the thumbnail within the document as thumbnail graphic, and tags the thumbnail page internally. In step 227, if the user elects to display the thumbnail, then in step 228 the thumbnail information is retrieved and displayed. If the user elects not to display the thumbnail, the asset management system queries the document for the thumbnail page (step 229.) Step 230 tags thumbnail page, which is retrieved and sent to the asset management system.

It will be appreciated that the method of selecting the thumbnail of the document could be done as a preprocessing step, wherein once a thumbnail is generated it is stored along with the file. Alternatively method could be performed spontaneously whenever a document is, presented for viewing such as in a file explorer window.

A preferred embodiment uses the following weighting algorithm to determine the most appropriate thumbnail of a multi-page document. Other weighting algorithms can be used without deviating from the spirit of the invention.

1. Assign Weights W1, W2 ... Wn to the various rich content types present in the document, where n=number of rich content types in the document. For example the weight W1 is assigned to hyperlinks.
2. Let S1, S2 ... Sm be the Score of each page where m=total number of pages in the document.
3. Initialise S1=S2= ... Sm=0.
4, For a given Page P(i), $$\text{Score of Page } i = S(i) = (Wj*Cj) \text{ where } j \text{ varies from 1 to } k.$$

Wj=Weight of Rich content type j.
Cj=Count of Rich content type j on Page Pi.
k=Number of Rich content types present on Page i.
5. Thumbnail of the document=Page with the highest score, i.e., the maximum of S1, S2 ... Sn.

Figure 3:
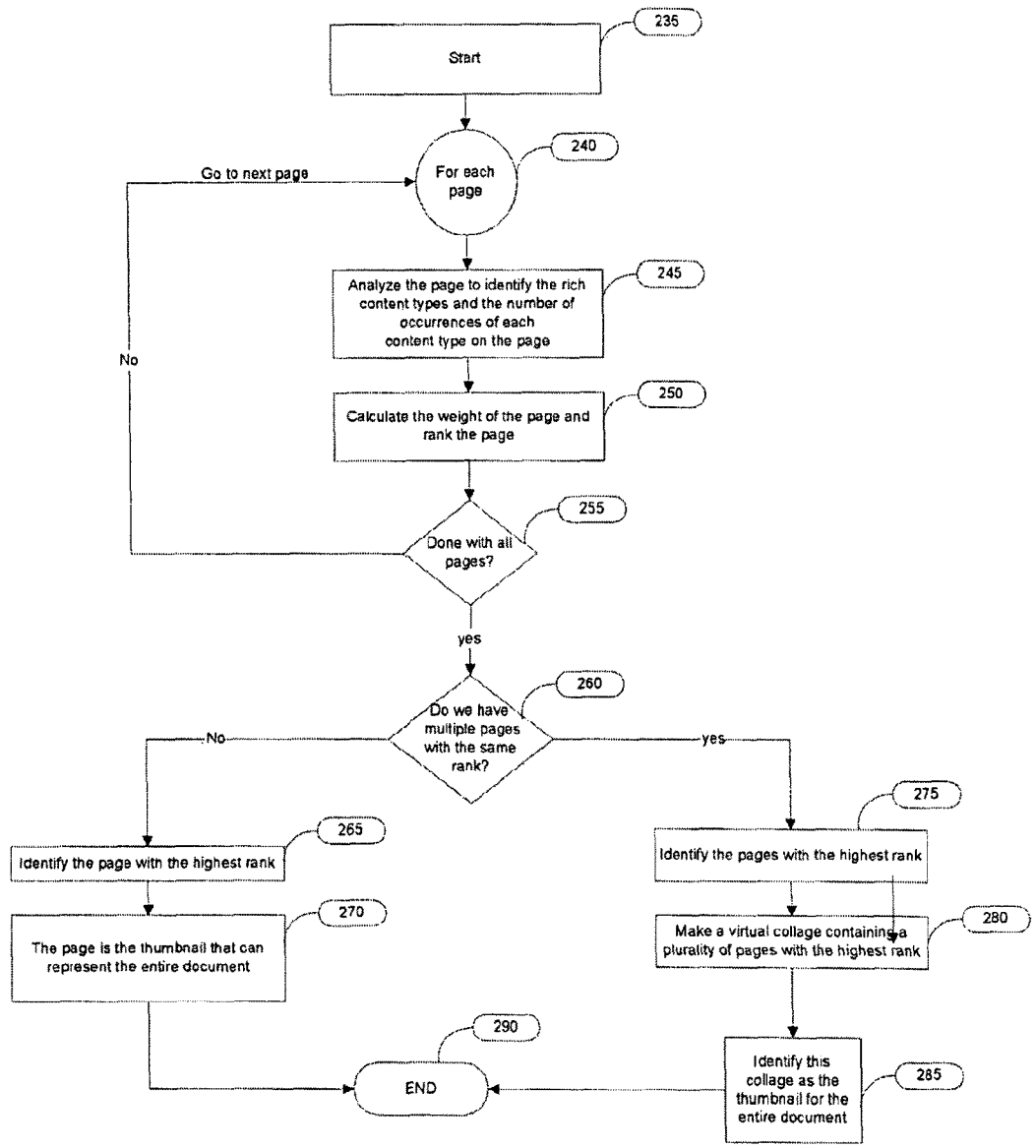
FIG. 3 is a flowchart illustrating sequence of steps for an embodiment of the invention which identifies a multi-page collage as a thumbnail of the document.

FIG. 3 is a flowchart illustrating the sequence of steps in identifying a collage as the thumbnail of a multi-page document in accordance with a preferred embodiment of the invention. Step 235 starts. For each page in step 240, step 245 analyzes the rich content type and the number of occurrences of rich content type. Based on this analysis step 250 assigns a score to each page. After step 255 when all pages are done, step 260 inquires whether there are multiple pages with the same highest score. If not, step 265 identifies the page with the highest score as the most relevant thumbnail (step 270) and the process ends (step 290). In step 260 if there are multiple pages with the same high score, those pages are identified in step 275. In step 280 the plurality of highest-scoring pages are collected into a collage which step 285 identifies as the thumbnail of the document. A collage is defined as a collection of elements that together constitute a single entity. In an embodiment of the invention, the collage refers to the plurality of highest-scoring pages collected together and stored as a single thumbnail graphic, which is then identified as the thumbnail of the document. The process ends in step 290.

Figure 4:
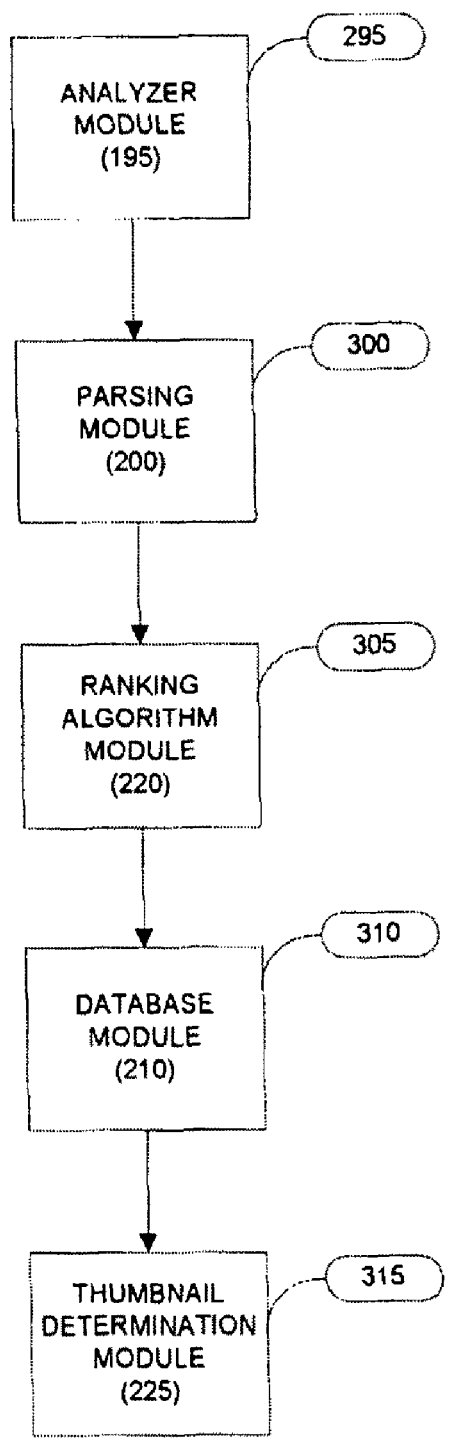
FIG. 4 is a block diagram view of an embodiment of the invention.

FIG. 4 is a block diagram view of an embodiment of the invention. Analyzer module 295 performs FIG. 2 step 195 of analyzing each page for its amount of rich content and its number of occurrences. Parsing module 300 performs step 200 of parsing each page and assigning it a score based on the analysis of rich content. Ranking algorithm module 305 performs step 220 of keeping track of which page(s) has the highestscore. Database module 310 or step 165 stores the page number with the list of rich content types and the number of occurrences of rich content on page. Based on the assigned scores, the thumbnail determination module 315 in step 225 identifies the page with the highest score as the thumbnail of the document.

Figure 5:
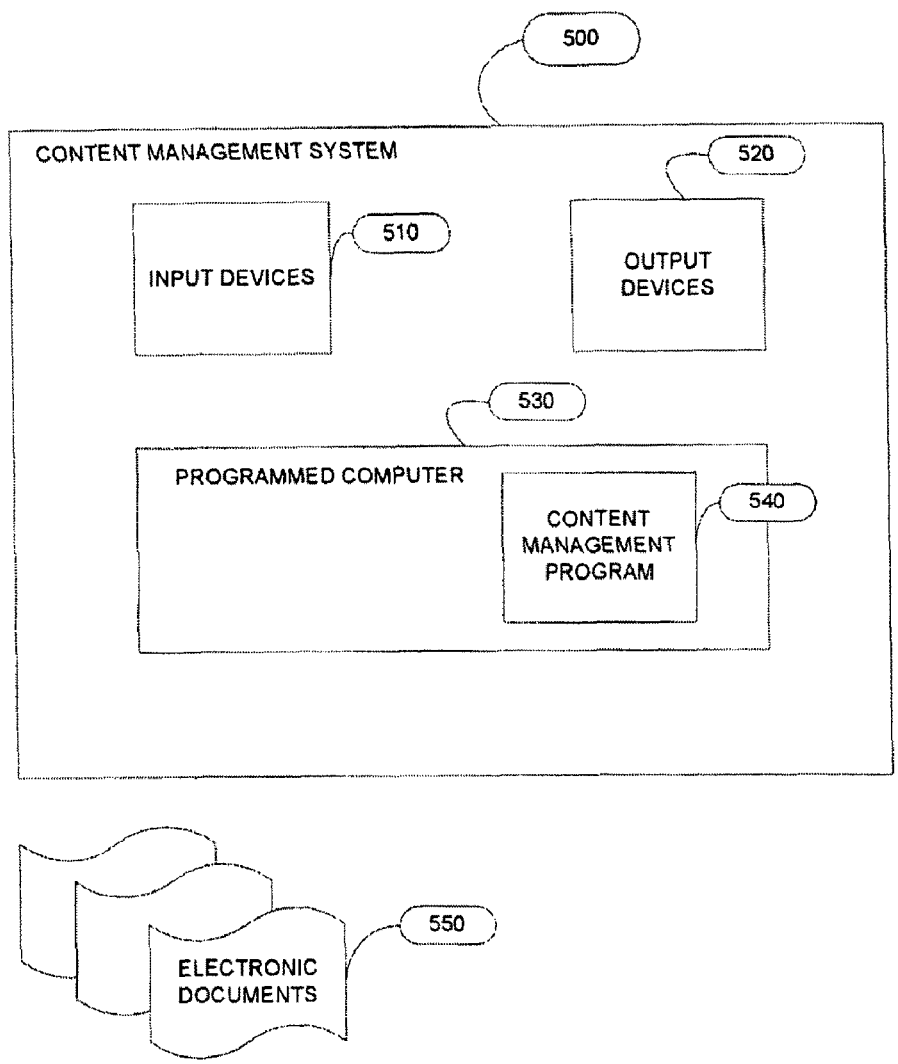
FIG. 5 illustrates an embodiment of a content management system.

The method of one embodiment of the invention is preferably performed by a content management program 540 running on a computer 530 in a content management system 500 as shown in FIG. 5. The system typically also has input devices 510 and output devices 520. Content management program 540 enables creating, manipulating, managing, storing and displaying electronic documents 550. Such documents are typically characterized by content information, such as text images and the like, and can include for example web pages, PDF documents, electronic books or documents (including files) in other conventional formats. Users can use content management program 540 to view displayed content and thumbnails for the displayed content. The content management program 540 can be implemented as part of a web browser or a conventional content management program such as Adobe Acrobat® or Adobe InDesign®. An embodiment of the invention can be implemented and perform the method steps in digital electronic circuitry, or in computer hardware, firmware, software, in a machine-readable storage device, or in combinations of them.

Figure 6:
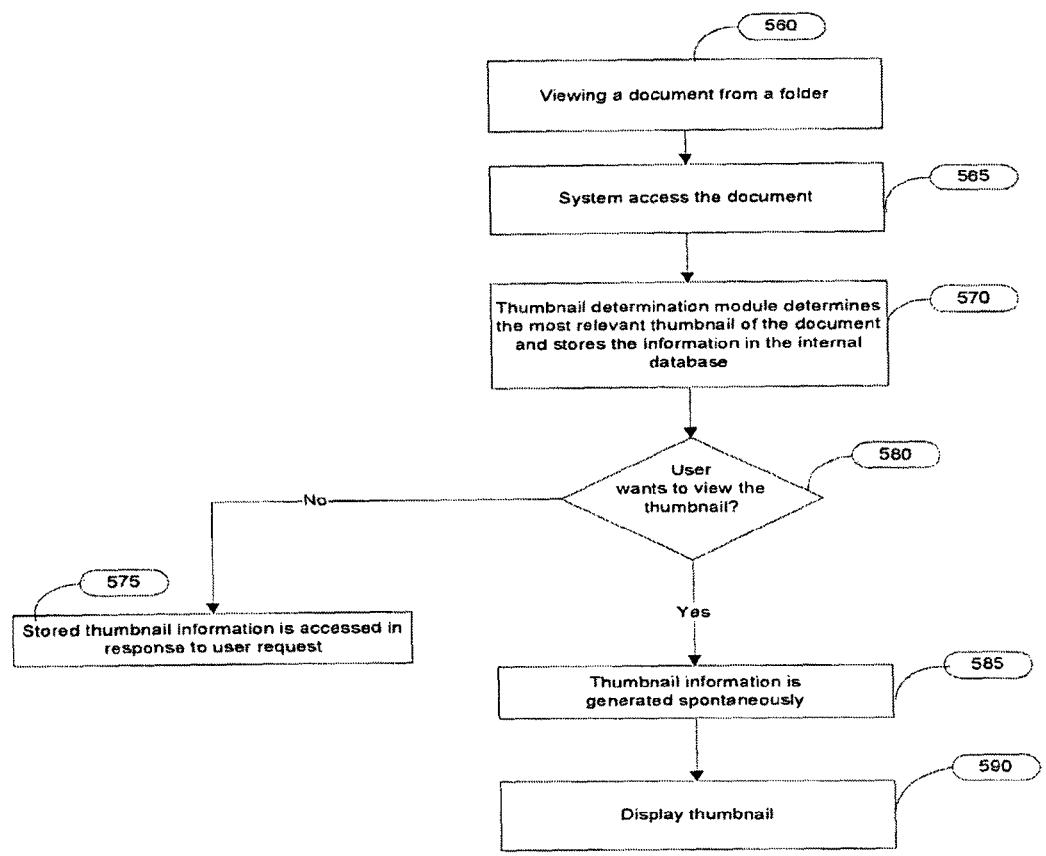
FIG. 6 illustrates an embodiment of the invention.

FIG. 6 is an illustration of an embodiment of the invention. In step 560, if a viewer wishes to view a document from a folder, the system accesses the document in step 565. In step 570, a thumbnail determination module determines the most relevant thumbnail of the document and stores the information in an internal database. If the user wishes to view the document (step 580), the thumbnail information is generated spontaneously. Step 590 displays the thumbnail. If the user does not wish to view the thumbnail, the thumbnail information as stored in accessed in the future in response to user request (step 575.)

While embodiments of the present invention are disclosed in terms of exemplary embodiments, it can be practiced in a number of ways as defined by the scope of the appended claims. Additionally, various features of embodiments of the invention can be modified in a myriad of ways to achieve the goal of analyzing the rich of a document to automatically determine the most relevant thumbnail of the document.

We claim:

1. A computer-implemented method, comprising:
   analyzing a plurality of pages of a multi-page document to identify quantity and type of rich content in each one of the plurality of pages;
   assigning a score to each one of the plurality of pages in the multi-page document, wherein the score for a respective one of the plurality of pages is dependent on the quantity of rich content items on the respective one of the plurality of pages and the type of each rich content item on the respective one of the plurality of pages, wherein said assigning comprises scoring each page based on the quantity and type of rich content items within that page;
   identifying a page of the plurality of pages with the highest score; and
   designating the page with the highest score to be displayed as a thumbnail of the multi-page document, wherein the thumbnail is a single visual representation for the multi-page document.

2. The method of claim 1, further comprising:
   generating the thumbnail of the multi-page document from the designated page;
   storing the thumbnail of the multi-page document; and
   in response to user input, retrieving the thumbnail of the multi-page document.

3. The method of claim 1, further comprising:
   tagging the designated page;
   sending the designated page to an asset management system to represent the multi-page document using the designated page.

4. The method of claim 1, further comprising displaying said thumbnail of the designated page of the multi-page document.

5. The method of claim 1, wherein said analyzing comprises determining an amount of rich content on each of the plurality of pages.

6. The method of claim 1, wherein said analyzing comprises counting a number of occurrences of rich content on each of the plurality of pages.

7. The method of claim 1, wherein said rich content comprises one or more of an image, a comment, a video, a graphic, audio, a table, or text with styling.

8. The method of claim 1, wherein said analyzing, said assigning, said identifying and said designating are performed in response to presentation of the multi-page document for viewing.

9. A computer-implemented method of selecting content for use as a thumbnail from a multi-page document, comprising:
- analyzing a plurality of pages of the multi-page document to identify quantity and type of rich content in each one of the plurality of pages;
- assigning each one of the plurality of pages a score, wherein the score for a respective one of the plurality of pages is dependent on the quantity of rich content items on the respective one of the plurality of pages and the type of each rich content item on the respective one of the plurality of pages, wherein said assigning comprises scoring each page based on the quantity and type of rich content items within that page;
- identifying a subset of the plurality of pages of the multi-page document, wherein the identified subset is less than all of the plurality of pages of the multi-page document, and wherein each page in the identified subset has a highest score; and
- designating the identified subset of the plurality of pages to be displayed as the thumbnail of the multi-page document, wherein the thumbnail is a single visual representation for the multi-page document.

10. The method of claim 9, wherein said analyzing comprises determining an amount of rich content on each one of the plurality of pages.

11. The method of claim 9, wherein said analyzing comprises counting a number of occurrences of rich content on each one of the plurality of pages.

12. The method of claim 9, wherein the thumbnail comprises a collage, and wherein the collage comprises the identified subset of the plurality of pages.

13. The method of claim 9, wherein said rich content comprises one or more of an image, a comment, video, a graphic, audio, a table, or text with styling.

14. A machine-readable storage device storing instructions executable by a processor to:
- analyze a plurality of pages of a multi-page document to identify quantity and type of rich content in each one of the plurality of pages;
- assign a score to each one of the plurality of pages in the multi-page document, wherein the score for a respective one of the plurality of pages is dependent on the quantity of rich content items on the respective one of the plurality of pages and the type of each rich content item on the respective one of the plurality of pages, wherein said assigning comprises scoring each page based on the quantity and type of rich content items within that page;
- identify a page of the plurality of pages with the highest score; and
- designate the page with the highest score to be displayed as a thumbnail of the multi-page document, wherein the thumbnail is a single visual representation.

15. The machine-readable storage device of claim 14, wherein said analyzing a plurality of pages comprises determining an amount of rich content on each one of the plurality of pages.

16. The machine-readable storage device of claim 14, wherein said analyzing comprises counting a number of occurrences of rich content on each one of the plurality of pages.

17. The machine-readable storage device of claim 14, wherein said rich content comprises one or more of an image, a comment, video, a graphic, audio, a table, or text with styling.

18. A machine-readable storage device storing instructions operable to cause a programmable processor to:
- analyze a plurality of pages of a multi-page document to identify quantity and type of rich content in each one of the plurality of pages;
- assign a score to each one of the plurality of pages in the multi-page document, wherein the score for a respective one of the plurality of pages is dependent on the quantity of rich content items on the respective one of the plurality of pages and the type of each rich content item on the respective one of the plurality of pages, wherein said assigning comprises scoring each page based on the quantity and type of rich content items within that page;
- identify a subset of the plurality of pages of the multi-page document, wherein the identified subset is less than all of the plurality of pages of the multi-page document, and wherein each page in the identified subset has a highest score; and
- designate the identified subset of the plurality of pages to be displayed as a thumbnail of the multi-page document, wherein the thumbnail is a single visual representation for the multi-page document.

19. The machine-readable storage device of claim 18, wherein the thumbnail comprises a collage, and wherein the collage comprises the subset of the plurality of pages.

20. A system, comprising:
- a computer configured to implement:
  - an analyzer module operable to analyze a plurality of pages of a multi-page document to identify quantity and type of rich content in each one of the plurality of pages;
  - a scoring module operable to assign a score to each one of the plurality of pages in the multi-page document, wherein the score for a respective one of the plurality of pages is dependent on the quantity of rich content items on the respective one of the plurality of pages and the type of each rich content item on the respective one of the plurality of pages, wherein said assigning comprises scoring each page based on the quantity and type of rich content items within that page; and
  - a thumbnail determination module operable to identify a page of the plurality of pages with a highest score to be displayed as a thumbnail of the multi-page document, wherein the thumbnail is a single visual representation for the multi-page document.

21. The system of claim 20, wherein the computer is further configured to implement:
- a database module operable to store page numbers, a list of rich content types and a respective count of a quantity of each rich content type identified on each of the plurality of pages.

* * * * *